Patented Apr. 5, 1949

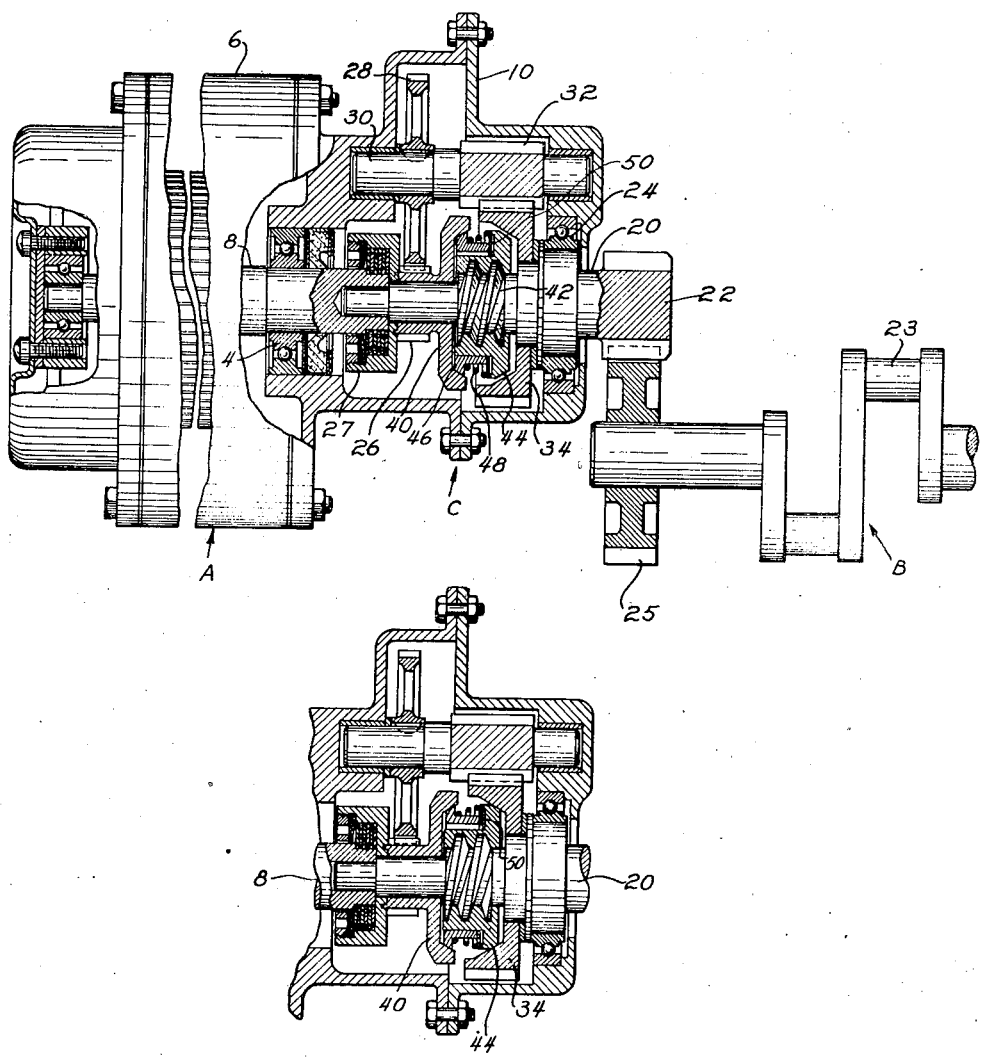

2,466,461

UNITED STATES PATENT OFFICE 2,466,461

STARTER-GENERATOR GEARING FOR INTERNAL-COMBUSTION ENGINES

Gerhard Mauric and Ralph E. Green, Los Angeles, and Nathaniel L. Rosin, Hollywood, Calif., assignors to Electrical Engineering and Manufacturing Corporation, Los Angeles, Calif., a corporation of California Application August 6, 1946, Serial No. 688,646

1 Claim. (Cl. 74—6)

This invention relates in general to devices and systems for starting an internal combustion engine and for generating electric energy during the operation of the engine by power derived therefrom.

Combined starting and generating devices for use with internal combusition engines are now well known. These devices comprise, in general, an electric machine and gearing connecting the machine to the crankshaft of an internal combustion engine, the gearing being operable to effect a speed reduction when the electric machine is driving the crankshaft to start the engine, and being operable to cause the electric machine to be driven at a suitable speed when the engine has started and is driving the electric machine as a generator. While such devices have heretofore been most widely used on automobiles they are useful with all internal combustion engines, regardless of the use or type thereof and are, of course, useful on aircraft. In this latter field of use, however, rigid standards of weight, reliability and simplicity are imposed which have not heretofore concerned those skilled in this art and it has been found that many known devices are entirely unsuited to aircraft use.

In one of its principal aspects this invention relates to the general structure and arrangement of parts of devices of the described type and has for one of its principal objects the provision of a starter-generator device having not only a minimum number of parts but utilizing only the simplest of mechanisms and components, whereby the weight of the device is kept at a minimum and the ease of repair and replacement of parts is advanced, thus making the device provided by this invention particularly useful in the aircraft field although not limited thereto in any way. In connection with this object of the invention, it has been one of our objects to provide a starter-generator device having a particularly simple power-transmitting gearing which will not include the complicated gear arrangements and one-way roller clutch devices of known structures.

These objects and other inherent in the invention have been realized by this invention and are incorporated in an embodiment thereof which is disclosed in the following description and the annexed drawings. The disclosure of this preferred embodiment is for purposes of illustration of the invention only, and imposes no limitations on the invention not imposed by the appended claim.

Referring to the drawings, in which similar reference numerals refer to like parts, Fig. 1 is part-sectional view showing, schematically, an internal combustion engine, an electric machine which is operable to start the engine and is also operable as a generator, and showing more particularly the power-transmitting mechanism connecting the engine and the electric machine, and Fig. 2 is a view showing the power-transmitting mechanism with the parts in the position occupied when the motor-generator is starting the engine.

In carrying the invention into effect there is provided a reduction gearing assembly having an input gear which is drivingly connected to the rotor of an electric machine, which may be operated as a motor or generator, and also having an output gear. There is also provided a shaft which is drivingly connected to the crankshaft of an internal combustion engine, and with this shaft are associated two clutch devices, one of which is operable when the electric machine is operated as a starter motor to connect the shaft and the crankshaft to the output gear of the reduction gearing assembly, to cause the crankshaft to be rotated at a reduced speed provided by the reduction gearing to start the engine, and the other of which is operable when the crankshaft is rotated during running of the engine to connect the same to the rotor of the electric machine to cause such machine to be operated as a generator. The parts are so arranged and operable that when each clutch device is transmitting driving torque the other clutch device is inoperative and transmits no driving torque.

The preferred embodiment of the invention which is disclosed in the drawings comprises an electric machine A, an internal combustion engine B and a power-transmitting mechanism C which is operable to connect the armature of the machine A to the crankshaft of the engine B. The mechanism C is so operable that when the machine A is operated as a motor the engine crankshaft will be rotated, in order to be started, at a speed less than that of the armature of machine A and is also so operable that when the engine starts and is running under its own power the armature of the electric machine will be rotated at a suitable speed to cause such machine to generate electric energy. The electric machine is preferably of the usual structure of a motor or generator, comprising a stator and a rotating armature supported in bearings 2, 4 and being enclosed in a casing 6. The end of the armature shaft 8 adjacent bearing 4 extends into a housing 10 which is attached to the end of the casing and within which the power-transmitting mechanism C is housed.

The power-transmitting mechanism comprises a rotatable shaft 20 one end of which is freely and rotatably journaled in a recess in the end of armature shaft 8 and the other end of which is external to casing 10 and is provided with a pinion gear 22 which is operably connected to the crankshaft 23 of the internal combustion engine B through means external to the housing 10, such as the timing gear 25. Intermediate its ends the shaft 20 is supported by gearing 24 in the wall of housing 10. Within housing 10 and adjacent the end of the armature shaft 8 a pinion gear 26 is freely and rotatably mounted on shaft 20 and is drivingly connected to armature shaft 8 through a torque-limiting connection 27 which is preferably of the type and structure described and claimed in the co-pending application of Gerhard Mauric, Serial No. 688,645.

The pinion gear 26 meshes with a gear 28 which is keyed to a jack-shaft 30, which also comprises a pinion gear 32 which is in mesh with a gear 34 which is freely and rotatably mounted on shaft 20. It will be apparent that the gear train 26, 28, 32, 34 will provide a speed reduction whereby rotation of pinion gear 26 will cause gear 34 to be rotated at a speed less than that of the pinion gear.

Means are provided by the invention for transmitting the rotation of the armature shaft 8 and pinion 26 to shaft 20, through the described reduction gearing and, under other conditions, for transmitting the rotation of crankshaft 23 and shaft 20 to pinion 26 and the armature shaft without the interposition of the reduction gearing. Such means comprise a disc 40 which is rigidly connected to pinion gear 26 and has an internal frusto-conical clutch surface. This part is referred to in this application as the "pinion disc." A similar internal, frusto-conical surface is formed on gear 34 and faces the cone surface on the pinion disc. Between the pinion disc and gear 34 the shaft 20 has a quick-action thread 42 formed thereon to receive the correspondingly threaded sleeve of a "cone nut" 44 having a frusto-conical surface facing the cone surface on gear 34 and adapted to be moved into and out of engagement therewith by relative rotation of shaft 20 and the cone nut. A member 46 surrounds the sleeve of cone nut 44 and is splined thereto whereby it must rotate therewith but can move axially thereof. This member 46 has a frusto-conical surface facing that on the pinion disc 40 and is normally held in engagement therewith by a coil compression spring 48 surrounding the cylindrical sleeves of cone nut 44 and member 46. An annular flat spring 50 is disposed between cone nut 44 and member 46 and normally exerts no force on these members, but is adapted to yieldingly resist movement of such members toward each other in order to prevent damage to the power-transmitting mechanism C and the electric machine A in the event the engine backfires during or after stopping. Reference is made to the aforesaid co-pending application of Gerhard Mauric for a full disclosure of the mode of operation of the parts, including spring 50, in the event of such backfire.

The operation of the mechanism will now be described. Assuming that all of the parts are at rest and that it is desired to start the internal combustion engine B, the parts will be found in the positions shown in Fig. 1, and current may be applied to the motor-generator A to operate the same. The rotation of armature shaft 8 will be transmitted to pinion gear 26 through the torque limiter 27, causing rotation of gear 34 through the reduction gearing. Until this time shaft 20 will be held from rotation by the inertia of the internal combustion engine B, the clutch surface on member 46 will be in engagement with the corresponding surface of pinion disc 40, and the clutch surfaces on cone nut 44 and gear 34 will be separated, having been left in such condition on the earlier stopping of the engine. Rotation of pinion gear 26 will be transmitted through friction surfaces 40 and 46 and will cause cone nut 44 to move axially into contact with gear 34. The parts will now be in the position shown in Fig. 2. Rotation of gear 34 will now cause cone nut 44 to tighten against gear 34, thus locking these two parts together and causing the rotation of gear 34 to be transmitted to shaft 20. The crankshaft of the engine will therefore be rotated at the reduced speed provided by the reduction gearing, thus starting the engine. The relation of the parts is such that any rotation imparted to member 46 by the pinion disc at this time will tend to cause the cone nut 44 and member 46 to move to the right on shaft 20, by reason of which there is no direct transmission of rotation from pinion 26 to shaft 20, such shaft being rotated only through the reduction gearing.

When the engine starts and is running under its own power it will rotate shaft 20 in the same direction as such shaft was rotated during the starting operation, but at a higher speed. This will cause relative rotation to take place between shaft 20 and cone nut 44 which will cause the cone nut to run up the threads 42 in a direction away from gear 34, thus relieving the connection between these parts and compressing the coil spring 48. The parts will now be in the position shown in Fig. 1. The clutch surface on member 46 will therefore be forced into tight engagement with the corresponding surface on pinion disc 40, whereby the rotation of the engine crankshaft and shaft 20 will be transmitted through threads 42, cone nut 44, member 46, pinion disc 40, pinion 26 and torque limiter 27 to the shaft 8 of the motor-generator A, operating the same as a generator. The gear 34 is disconnected from shaft 20 by movement of the cone nut 44 away from it, and the reduction gearing 28, 30, 32, 34 merely idles when the engine drives the generator.

It will be seen that the described and illustrated device will operate completely automatically to effect the desired starting of the engine or operation of the electric machine as a generator of electricity, performing these functions with a minimum number of parts, all of which are of simple construction and arrangement. The use of roller clutches is completely avoided, as is the requirement of any manual control means.

While we have described and illustrated but one embodiment of our invention it will be apparent to those skilled in the art that other embodiments, as well as modifications of that disclosed, may be made without departing in any way from the spirit or scope of the invention, for the limits of which reference must be had to the appended claim.

What is claimed is:

A starter-generator for internal combustion engines, comprising a rotatable shaft adapted to be drivingly connected to the crankshaft of an engine and having a threaded portion, a reduction gearing assembly including an input gear adapted to be drivingly connected to the rotor of an electric machine and an output gear both of which are freely and rotatably mounted on the shaft at opposite ends of said threaded portion and have spaced, facing clutch surfaces formed thereon, a clutch member having a sleeve part threaded to the shaft and having a clutch part adapted to move into and out of clutching engagement with the clutch surface on the output gear of the reduction gearing assembly by threading of the clutch member with respect to the shaft, and a second clutch member having a part surrounding and keyed to the sleeve of the first clutch member for rotation therewith and axial movement with respect thereto and having a clutch part adapted to be moved into and out of clutching engagement with the clutch surface on the input gear, and a compression spring disposed between and bearing against the two clutch members.

GERHARD MAURIC.
RALPH E. GREEN.
NATHANIEL L. ROSIN.

REFERENCES CITED

The following references are of record in the file of this patent:

FOREIGN PATENTS

| Number | Country | Date |
|---|---|---|
| 430,044 | Great Britain | June 12, 1935 |
| 687,056 | France | Apr. 22, 1930 |